United States Patent
Kizuka et al.

(10) Patent No.: US 10,480,426 B2
(45) Date of Patent: Nov. 19, 2019

(54) METHOD OF CONTROLLING GAS ENGINE AND GAS ENGINE DRIVE SYSTEM

(71) Applicant: KAWASAKI JUKOGYO KABUSHIKI KAISHA, Kobe-shi, Hyogo (JP)

(72) Inventors: Tomoaki Kizuka, Takatsuki (JP); Yosuke Nonaka, Himeji (JP); Hiroyoshi Ishii, Kobe (JP); Satoru Fukao, Kobe (JP); Shigeharu Fujihara, Amagasaki (JP); Towa Hirayama, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 16/074,003

(22) PCT Filed: Nov. 1, 2016

(86) PCT No.: PCT/JP2016/082433
§ 371 (c)(1),
(2) Date: Jul. 30, 2018

(87) PCT Pub. No.: WO2017/130501
PCT Pub. Date: Aug. 3, 2017

(65) Prior Publication Data
US 2019/0040806 A1    Feb. 7, 2019

(30) Foreign Application Priority Data

Jan. 29, 2016 (JP) .................................. 2016-015775

(51) Int. Cl.
*F02D 37/02* (2006.01)
*F02D 19/02* (2006.01)
(Continued)

(52) U.S. Cl.
CPC .............. *F02D 37/02* (2013.01); *F02B 37/00* (2013.01); *F02D 19/02* (2013.01); *F02D 19/024* (2013.01);
(Continued)

(58) Field of Classification Search
CPC ........ F02D 37/02; F02D 19/02; F02D 19/024; F02D 23/00; F02D 23/02; F02D 41/0027;
(Continued)

(56) References Cited

U.S. PATENT DOCUMENTS

| | | | | |
|---|---|---|---|---|
| 6,062,190 A * | 5/2000 | Nakajima | ............. | F02P 5/1502 123/295 |
| 8,798,893 B2 * | 8/2014 | Kachi | ................. | F02D 41/0235 123/492 |

(Continued)

FOREIGN PATENT DOCUMENTS

| | | |
|---|---|---|
| GB | 2208410 A | 3/1989 |
| JP | 2009-057870 A | 3/2009 |

(Continued)

*Primary Examiner* — Hieu T Vo
(74) *Attorney, Agent, or Firm* — Oliff PLC (57) ABSTRACT

A method of controlling a gas engine connected to a turbocharger including a compressor and a turbine includes: performing a knocking control operation of optimizing an ignition timing as a steady operation; and in a case where a load of the gas engine increases during the steady operation, when a degree of increase in the load is relatively small, gradually increasing an actual fuel injection amount while keeping the ignition timing, and when the degree of increase in the load is relatively great, retarding the ignition timing and then gradually increasing the actual fuel injection amount.

8 Claims, 10 Drawing Sheets

(51) Int. Cl.
*F02D 23/02* (2006.01)
*F02D 43/00* (2006.01)
*F02D 45/00* (2006.01)
*F02D 41/04* (2006.01)
*F02B 37/00* (2006.01)
*F02P 5/15* (2006.01)
*F02M 21/02* (2006.01)
*F02D 23/00* (2006.01)
*F02D 41/10* (2006.01)
*F02D 41/14* (2006.01)
*F02D 41/00* (2006.01)
*F02D 31/00* (2006.01)

(52) U.S. Cl.
CPC ............. *F02D 23/00* (2013.01); *F02D 23/02* (2013.01); *F02D 41/0027* (2013.01); *F02D 41/04* (2013.01); *F02D 41/045* (2013.01); *F02D 41/10* (2013.01); *F02D 41/1454* (2013.01); *F02D 43/00* (2013.01); *F02D 45/00* (2013.01); *F02M 21/02* (2013.01); *F02P 5/15* (2013.01); *F02D 31/007* (2013.01); *F02M 21/023* (2013.01); *F02P 5/1516* (2013.01); *Y02T 10/144* (2013.01); *Y02T 10/32* (2013.01); *Y02T 10/46* (2013.01)

(58) Field of Classification Search
CPC ........ F02D 41/04; F02D 41/045; F02D 41/10; F02D 41/1454; F02D 43/00; F02D 45/00; F02D 31/007; F02B 37/00; F02P 5/15; F02P 5/1516; F02M 21/02; F02M 21/023; Y02T 10/144; Y02T 10/32; Y02T 10/46
See application file for complete search history.

(56) References Cited

U.S. PATENT DOCUMENTS

2002/0179055 A1* 12/2002 Ganser ................. F02D 11/105
123/406.44
2003/0051685 A1 3/2003 Hiyoshi et al.
2009/0071439 A1 3/2009 Shiraishi et al.
2011/0259298 A1 10/2011 Imamura et al.

FOREIGN PATENT DOCUMENTS

JP 2010-084681 A 4/2010
JP 2015-132206 A 7/2015

* cited by examiner

RETARD ANGLE $\varepsilon$ MAP

|  | | ACTUAL FUEL INJECTION AMOUNT q[m³] | |
|---|---|---|---|
|  | | SMALL ... | LARGE |
| ACTUAL ROTATIONAL SPEED N [rpm] | LOW | $\varepsilon_{1,1}$ ... | $\varepsilon_{n,1}$ |
|  | ⋮ | ⋮ | ⋮ |
|  | HIGH | $\varepsilon_{1,m}$ ... | $\varepsilon_{n,m}$ |

Fig. 6A

RETARD ANGLE $\varepsilon$ MAP

|  | | ACTUAL CHARGE AIR PRESSURE P[Pa] | |
|---|---|---|---|
|  | | LOW ... | HIGH |
| ACTUAL ROTATIONAL SPEED N [rpm] | LOW | $\varepsilon_{1,1}$ ... | $\varepsilon_{n,1}$ |
|  | ⋮ | ⋮ | ⋮ |
|  | HIGH | $\varepsilon_{1,m}$ ... | $\varepsilon_{n,m}$ |

Fig. 6B

EXCESS AIR RATIO FIRST LOWER LIMIT $\lambda 1$ MAP

|  | | ACTUAL FUEL INJECTION AMOUNT q[m³] | |
|---|---|---|---|
|  | | SMALL ... | LARGE |
| ACTUAL ROTATIONAL SPEED N [rpm] | LOW | $\lambda 1_{1,1}$ ... | $\lambda 1_{i,1}$ |
|  | ⋮ | ⋮ | ⋮ |
|  | HIGH | $\lambda 1_{1,j}$ ... | $\lambda 1_{i,j}$ |

Fig. 7A

EXCESS AIR RATIO SECOND LOWER LIMIT $\lambda 2$ MAP

|  | | ACTUAL FUEL INJECTION AMOUNT q[m³] | |
|---|---|---|---|
|  | | SMALL ... | LARGE |
| ACTUAL ROTATIONAL SPEED N [rpm] | LOW | $\lambda 2_{1,1}$ ... | $\lambda 2_{i,1}$ |
|  | ⋮ | ⋮ | ⋮ |
|  | HIGH | $\lambda 2_{1,j}$ ... | $\lambda 2_{i,j}$ |

INJECTION AMOUNT FIRST UPPER LIMIT q1 MAP

|  |  | ACTUAL CHARGE AIR PRESSURE P[Pa] | | |
|---|---|---|---|---|
|  |  | LOW | ... | HIGH |
| ACTUAL ROTATIONAL SPEED N [rpm] | LOW | $q1_{1,1}$ | ... | $q1_{i,1}$ |
|  | ⋮ | ⋮ |  | ⋮ |
|  | HIGH | $q1_{1,j}$ | ... | $q1_{i,j}$ |

Fig. 10A

INJECTION AMOUNT SECOND UPPER LIMIT q2 MAP

|  |  | ACTUAL CHARGE AIR PRESSURE P[Pa] | | |
|---|---|---|---|---|
|  |  | LOW | ... | HIGH |
| ACTUAL ROTATIONAL SPEED N [rpm] | LOW | $q2_{1,1}$ | ... | $q2_{i,1}$ |
|  | ⋮ | ⋮ |  | ⋮ |
|  | HIGH | $q2_{1,j}$ | ... | $q2_{i,j}$ |

METHOD OF CONTROLLING GAS ENGINE AND GAS ENGINE DRIVE SYSTEM

TECHNICAL FIELD

The present invention relates to a method of controlling a gas engine connected to a turbocharger. The present invention also relates to a gas engine drive system including the turbocharger and the gas engine.

BACKGROUND ART

Conventionally, gas engines that combust a fuel gas, such as natural gas or town gas, have been mainly used in power generating equipment (see Patent Literature 1, for example). In recent years, in view of various issues such as the crude oil resource amount and exhaust gas regulations, it has been proposed to use a gas engine as a main engine of a ship instead of a diesel engine that uses heavy oil as a fuel.

For example, Patent Literature 2 discloses a 4-stroke gas engine used as a main engine of a ship. The gas engine is connected to a compressor and a turbine of a turbocharger via an intake passage and an exhaust passage. The intake passage is provided with a throttle valve, and a mixer that mixes air with a fuel gas supplied from a fuel flow control valve is provided upstream of the compressor.

In the gas engine disclosed by Patent Literature 2, in order to improve load responsiveness while keeping highly precise air-fuel ratio (excess air ratio) control, when a change occurs in a speed command value signal that is a target value of the engine rotational speed, the fuel gas flow rate controlled by the fuel flow control valve and the degree of opening of the throttle valve are changed. In particular, Patent Literature 2 describes in relation to the fuel gas flow rate that the upper limit value of the fuel gas flow rate may be determined based on the lower limit value of the excess air ratio in order to prevent misfire and abnormal combustion.

CITATION LIST

Patent Literature

PTL 1: Japanese Laid-Open Patent Application Publication No. 2010-84681
PTL 2: Japanese Laid-Open Patent Application Publication No. 2009-57870

SUMMARY OF INVENTION

Technical Problem

In a gas engine used in a load-varying application, during its steady operation in which the load hardly varies, it is desirable to perform a knocking control operation as described in Patent Literature 1. The knocking control operation is the operation of optimizing the ignition timing so as to achieve the highest efficiency in lean burn that realizes reduction of $NO_X$ emission and high efficiency. Specifically, in each cylinder of the gas engine, for every predetermined number of cycles, the ignition timing is advanced or retarded based on a deviation between a knocking occurrence ratio during the predetermined number of cycles and a target occurrence ratio.

Figure 13:
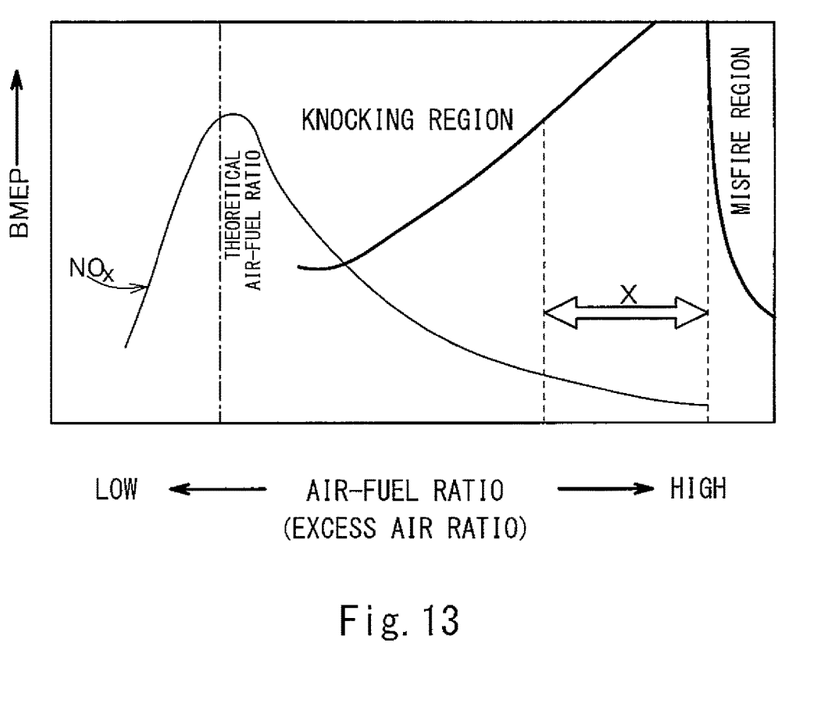
FIG. 13 is a graph showing a knocking region and a misfire region of a gas engine, the graph having a horizontal axis that represents air-fuel ratio and a vertical axis that represents brake mean effective pressure.

It is generally known that, in a gas engine, as shown in FIG. 13, there exist a knocking region and a misfire region based on the relationship between the air-fuel ratio and the brake mean effective pressure (BMEP). Therefore, in order to obtain high power under lean burn conditions, it is important to control the air-fuel ratio to be between the knocking region and the misfire region as indicated by a range X in FIG. 13. For reference, in current gas engines used in automobiles, importance is not put on efficiency, and combustion is performed close to the theoretical air-fuel ratio.

In the aforementioned knocking control operation, the target occurrence ratio is set immediately close to the knocking limit (a point on the line defining the knocking region in FIG. 13) so that the highest efficiency will be achieved in lean burn. Accordingly, while the knocking control operation is being performed as a steady operation, if the fuel gas is to be increased due to increase in the load, the amount of air supplied to the gas engine also needs to be increased, otherwise the operating point in the range X will move to the left, and the knocking occurrence ratio will exceed the knocking limit.

However, in a gas engine connected to a turbocharger, even when the fuel gas is increased, the amount of air discharged from the compressor does not increase immediately due to turbo lag. Therefore, in a case where no throttle valve is provided on the intake passage between the compressor and the gas engine, how to promptly increase the fuel gas while suppressing knocking is a technical problem.

In view of the above, an object of the present invention is to provide a method of controlling a gas engine, the method making it possible to improve load responsiveness (i.e., ability of actual output to follow required output) when the load increases while suppressing knocking even if no throttle valve is provided on the intake passage, and to provide a gas engine drive system including the gas engine.

Solution to Problem

The inventors of the present invention conducted diligent studies in order to solve the above-described problems. As a result of the studies, they have obtained the following findings: in a case where the load increases slowly, even when the fuel gas is increased by a margin from the knocking occurrence ratio to the knocking limit in the knocking control operation, it is not particularly necessary to improve the load responsiveness; however, in a case where the load increases rapidly, it is necessary to improve the load responsiveness. The inventors have also found that in a case where the load increases rapidly, the margin to the knocking limit is increased by retarding the ignition timing. The present invention has been made based on these findings.

Specifically, a method of controlling a gas engine according to the present invention is a method of controlling a gas engine connected to a turbocharger including a compressor and a turbine, and the method includes: performing a knocking control operation of optimizing an ignition timing as a steady operation; and in a case where a load of the gas engine increases during the steady operation, when a degree of increase in the load is relatively small, gradually increasing an actual fuel injection amount while keeping the ignition timing, and when the degree of increase in the load is relatively great, retarding the ignition timing and then gradually increasing the actual fuel injection amount.

According to the above configuration, in a case where the degree of increase in the load is relatively great, the margin of the excess air ratio to the knocking limit is increased by retarding the ignition timing, and thereby the actual fuel injection amount can be increased by a large volume. This consequently makes it possible to improve the load responsiveness while suppressing knocking.

The case where the load increases may be a case where a necessary fuel injection amount increases. When the degree of increase in the load is relatively small may be when an increase speed of the necessary fuel injection amount is less than a threshold. When the degree of increase in the load is relatively great may be when the increase speed of the necessary fuel injection amount is greater than the threshold. According to this configuration, whether or not the load has increased and the degree of increase in the load can be determined by monitoring the necessary fuel injection amount.

The case where the load increases may be a case where an actual rotational speed of the gas engine decreases from a target rotational speed. When the degree of increase in the load is relatively small may be when a deviation between the actual rotational speed and the target rotational speed is less than a threshold. When the degree of increase in the load is relatively great may be when the deviation between the actual rotational speed and the target rotational speed is greater than the threshold. According to this configuration, whether or not the load has increased and the degree of increase in the load can be determined by monitoring the actual rotational speed.

The case where the load increases may be a case where an actual charge air pressure that is a discharge pressure of the compressor decreases from a target charge air pressure. When the degree of increase in the load is relatively small may be when a deviation between the actual charge air pressure and the target charge air pressure is less than a threshold. When the degree of increase in the load is relatively great may be when the deviation between the actual charge air pressure and the target charge air pressure is greater than the threshold. According to this configuration, whether or not the load has increased and the degree of increase in the load can be determined by monitoring the actual charge air pressure.

The method may include: when the degree of increase in the load is relatively small, gradually increasing the actual fuel injection amount, such that an excess air ratio does not fall below a first lower limit; and when the degree of increase in the load is relatively great, gradually increasing the actual fuel injection amount, such that the excess air ratio does not fall below a second lower limit that is less than the first lower limit. According to this configuration, both when the degree of increase in the load is relatively small and when the degree of increase in the load is relatively great, the increase volume of the actual fuel injection amount can be determined to be maximized by using the lower limits of the excess air ratio.

The method may include: when the degree of increase in the load is relatively small, gradually increasing the actual fuel injection amount, such that the actual fuel injection amount does not exceed a first upper limit, and when the degree of increase in the load is relatively great, gradually increasing the actual fuel injection amount, such that the actual fuel injection amount does not exceed a second upper limit that is greater than the first upper limit. According to this configuration, both when the degree of increase in the load is relatively small and when the degree of increase in the load is relatively great, the increase volume of the actual fuel injection amount can be determined to be maximized by using the upper limits of the actual fuel injection amount.

For example, the gas engine may be used as a main engine of a ship.

A gas engine drive system according to the present invention includes: a gas engine connected to a turbocharger including a compressor and a turbine; a fuel injection system that injects a fuel gas into air supplied to the gas engine; an ignition system for igniting an air-fuel mixture of the fuel gas and the air; and a controller that controls the fuel injection system and the ignition system. The controller: performs a knocking control operation of optimizing an ignition timing as a steady operation; and in a case where a load of the gas engine increases during the steady operation, when a degree of increase in the load is relatively small, gradually increases an actual fuel injection amount while keeping the ignition timing, and when the degree of increase in the load is relatively great, retards the ignition timing and then gradually increases the actual fuel injection amount.

According to the above configuration, in a case where the degree of increase in the load is relatively great, the margin of the excess air ratio to the knocking limit is increased by retarding the ignition timing, and thereby the actual fuel injection amount can be increased by a large volume. This consequently makes it possible to improve the load responsiveness while suppressing knocking.

Advantageous Effects of Invention

The present invention makes it possible to improve the load responsiveness when the load increases while suppressing knocking.

DESCRIPTION OF EMBODIMENTS

Embodiment 1

Figure 1A:
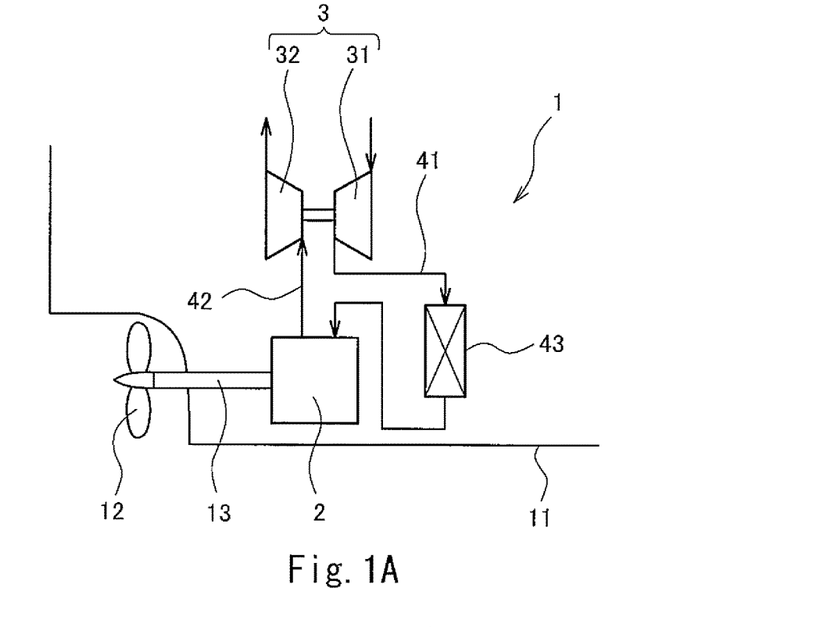
FIG. 1A shows a schematic configuration of a ship in which a gas engine drive system according to Embodiment 1 of the present invention is installed.
Figure 1B:
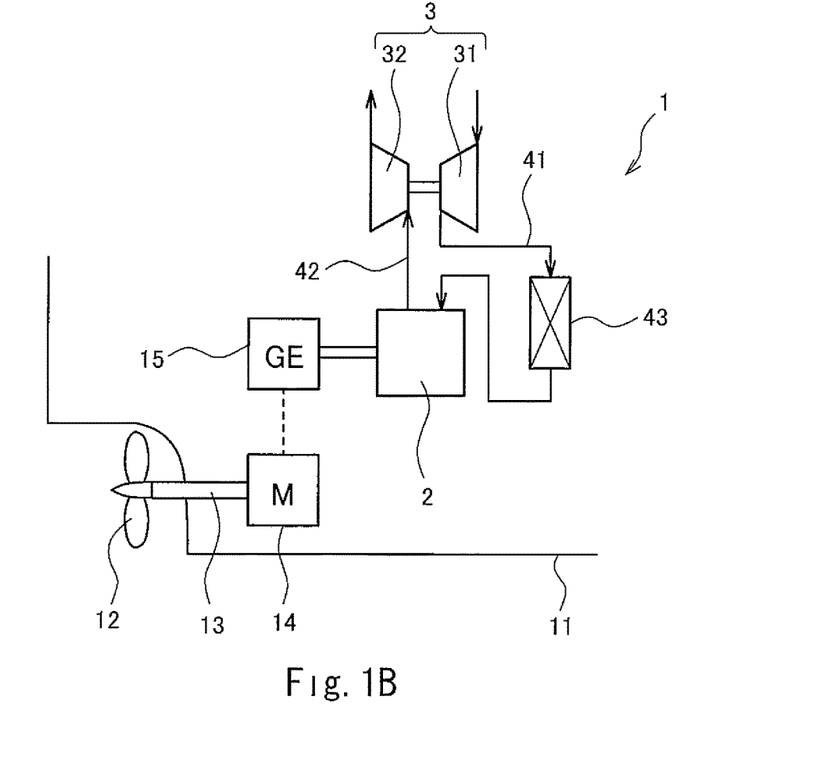
FIG. 1B shows a schematic configuration of the ship according to one variation.

FIG. 1A shows a ship 11, in which a gas engine drive system 1 according to Embodiment 1 of the present invention (hereinafter, simply referred to as "system 1") is installed. The system 1 includes a gas engine 2, a turbocharger 3, and a controller 7 (see FIG. 2). In the present embodiment, a propeller shaft 13 mounted with a propeller 12 is directly driven by the gas engine 2 of the system 1. However, as an alternative, the propeller shaft 13 may be indirectly driven by the gas engine 2 via a motor 14 and a power generator 15 as shown in FIG. 1B. In both the case shown in FIG. 1A and the case shown in FIG. 1B, the gas engine 2 is used as a main engine of the ship 11.

The gas engine 2 is, for example, a pure gas engine that combusts only a fuel gas (e.g., natural gas). Alternatively, the gas engine 2 may be a dual fuel engine that combusts one of or both a fuel gas and a fuel oil depending on the situation. Although the gas engine 2 is a 4-stroke engine in the present embodiment, the gas engine 2 may be a 2-stroke engine.

Figure 2:
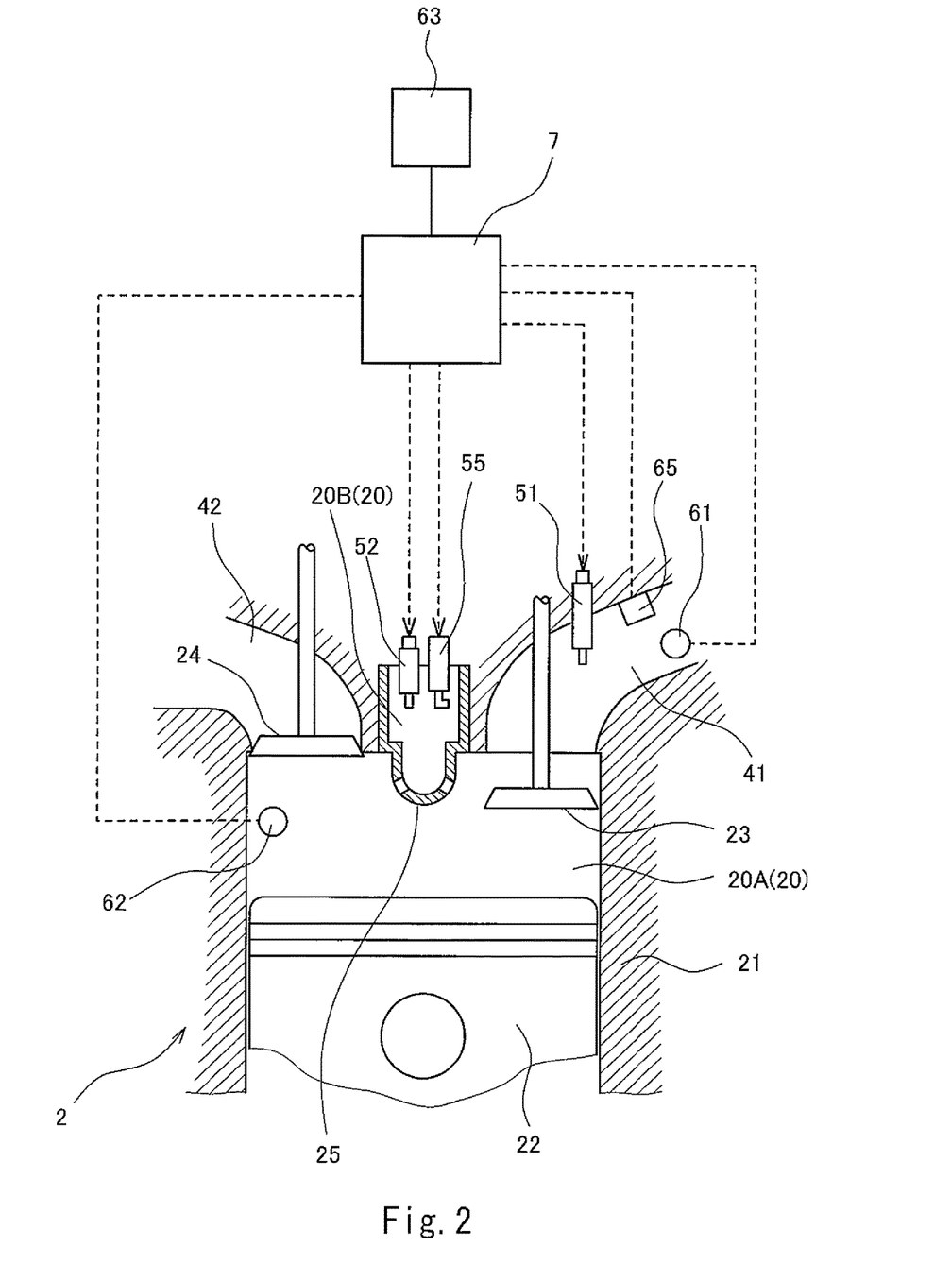
FIG. 2 is a sectional view showing one combustion chamber and its vicinity of a gas engine.

FIG. 2 is a sectional view showing an essential part of the gas engine 2. The gas engine 2 includes a plurality of cylinders 21 (FIG. 2 shows only one cylinder 21). In each cylinder 21, a piston 22 is disposed such that the piston 22 is movable in a reciprocating manner. The cylinder 21 and the piston 22 form a combustion chamber 20. The piston 22 is coupled to an unshown crank shaft by an unshown connecting rod.

In each cylinder 21, the piston 22 reciprocates twice, and thereby one cycle of the gas engine 2 (intake, compression, expansion, and exhaust) is performed. The phase angle (0 to 720 degrees) of the gas engine 2 during one cycle of each cylinder 21 is detected by a phase angle detector 63. For example, the rotation angle of the crank shaft (i.e., crank angle) or the position of the piston 22 can be used as the phase angle. As one example, the phase angle detector 63 is an electromagnetic pickup, a proximity switch, or a rotary encoder. An actual rotational speed N of the gas engine 2 is also detected from the phase angle detector 63.

Returning to FIG. 1A, the turbocharger 3 includes a compressor 31 and a turbine 32. The gas engine 2 is connected to the compressor 31 via an intake passage 41, and is also connected to the turbine 32 via an exhaust passage 42. The intake passage 41 leads air compressed by the compressor 31 to each cylinder 21, and the exhaust passage 42 leads combustion exhaust gas from each cylinder 21 to the turbine 32. It should be noted that, in reality, each of the downstream portion of the intake passage 41 and the upstream portion of the exhaust passage 42 branches off from a corresponding manifold into the same number of branch passages as the number of cylinders 21. However, in FIGS. 1A and 1B, each of the intake passage 41 and the exhaust passage 42 is drawn as a single passage for the sake of simplifying the drawings.

The intake passage 41 is provided with a radiator 43 for cooling air compressed by the compressor 31. The intake passage 41 is also provided with a first pressure sensor 61, which detects an actual charge air pressure P, which is the discharge pressure of the compressor 31, and a temperature sensor 65, which detects a charge air temperature, which is the temperature of air introduced into the combustion chamber 20 through the intake passage 41. The first pressure sensor 61 may be provided on each of the aforementioned downstream branch passages of the intake passage 41, or only one first pressure sensor 61 may be provided on the aforementioned manifold. Similarly, the temperature sensor 65 may be provided on each of the aforementioned downstream branch passages of the intake passage 41, or only one temperature sensor 65 may be provided on the aforementioned manifold. The intake passage 41 is further provided with, for each cylinder 21, a main fuel injection valve 51 (corresponding to a fuel injection system of the present invention), which injects a fuel gas into air discharged from the compressor 31.

It should be noted that the fuel injection system of the present invention need not be the fuel injection valve 51, so long as the fuel injection system injects the fuel gas into air supplied to the gas engine 2. For example, similar to Patent Literature 2, the fuel injection system may be configured to include: a fuel gas supply passage that merges with an air supply passage connected to the suction port of the compressor 31; and a fuel flow control valve provided on the fuel gas supply passage, and configured to inject the fuel gas into air sucked into the compressor 31.

Each cylinder 21 is provided with: an intake valve 23, which opens and closes an intake port that is an opening of the intake passage 41, the opening facing the combustion chamber 20; and an exhaust valve 24, which opens and closes an exhaust port that is an opening of the exhaust passage 42, the opening facing the combustion chamber 20. Each cylinder 21 is also provided with a spark plug 55 (corresponding to an ignition system of the present invention) for igniting an air-fuel mixture of the fuel gas and the air in the combustion chamber 20.

In the present embodiment, the combustion chamber 20 includes: a main combustion chamber 20A, which communicates with the intake passage 41 and the exhaust passage 42; and an auxiliary combustion chamber 20B, which is divided from the main combustion chamber 20A by a dividing wall 25 with communication holes formed therein. The spark plug 55 is disposed in the auxiliary combustion chamber 20B. The fuel gas is injected from an auxiliary fuel injection valve 52 into the auxiliary combustion chamber 20B. A rich air-fuel mixture is formed in the auxiliary combustion chamber 20B by the injection of the fuel gas from the auxiliary fuel injection valve 52, and the air-fuel mixture is ignited by the spark plug 55. As a result, a flame is generated in the auxiliary combustion chamber 20B, and the flame propagates into the main combustion chamber 20A through the communication holes formed in the dividing wall 25. Consequently, a lean air-fuel mixture in the main combustion chamber 20A is also ignited. The main combustion chamber 20A is provided with a second pressure sensor 62, which detects an in-cylinder pressure, which is the pressure in the main combustion chamber 20A.

It should be noted that the ignition system of the present invention is not limited to the spark plug 55, which ignites the air-fuel mixture in the auxiliary combustion chamber 20B. For example, a pilot fuel injection valve that directly injects a high-pressure pilot fuel (oil or fuel gas) into the main combustion chamber 20A to cause self-ignition of the pilot fuel can be adopted as the ignition system The combustion exhaust gas from the combustion chamber 20 is fed through the exhaust passage 42 to the turbine 32, in which the combustion exhaust gas is used as motive force for driving the compressor 31.

For each cylinder 21, the controller 7 controls the fuel injection valves 51 and 52 and the spark plug 55 based on the phase angle detected by the phase angle detector 63. Specifically, during a time in which the load hardly varies, the controller 7 performs a knocking control operation as a steady operation, and when the load increases during the steady operation, the controller 7 shifts to a load increase operation. In both the knocking control operation and the load increase operation, the controller 7 also performs PID control to keep the actual rotational speed N to a target rotational speed NT. It should be noted that the steady operation is the operation in which the fuel injection amount is substantially constant regardless of whether the load of the gas engine 2 is high or low. Factors that cause increase in the load include: a command from an operator of the ship to increase the navigation speed of the ship; a turning command when the operator steers the ship; a command to keep the navigation speed when the hull is subjected to strong winds and waves; and increase in the propeller pitch of the propeller 12 in a case where the propeller 12 is a variable pitch propeller.

In the present embodiment, the controller 7 calculates a necessary fuel injection amount Q corresponding to a required output (i.e., a necessary fuel gas injection amount for achieving the required output). In the present embodiment, since the fuel gas is injected from the main fuel injection valve 51 intermittently, the fuel gas injection amount means the injection amount per injection (in units of $m^3$, for example). However, if the fuel gas is continuously injected similar to Patent Literature 2, the fuel gas injection amount may be the flow rate of the fuel gas (in units of $m^3/s$, for example). Then, the controller 7 determines that the load has increased when the necessary fuel injection amount Q has increased.

Hereinafter, the knocking control operation and the load increase operation are described in detail. It should be noted that the description of control is given below for only one cylinder 21 as a representative example. The same control is performed for all the cylinders 21.

(1) Knocking Control Operation

Figure 3:
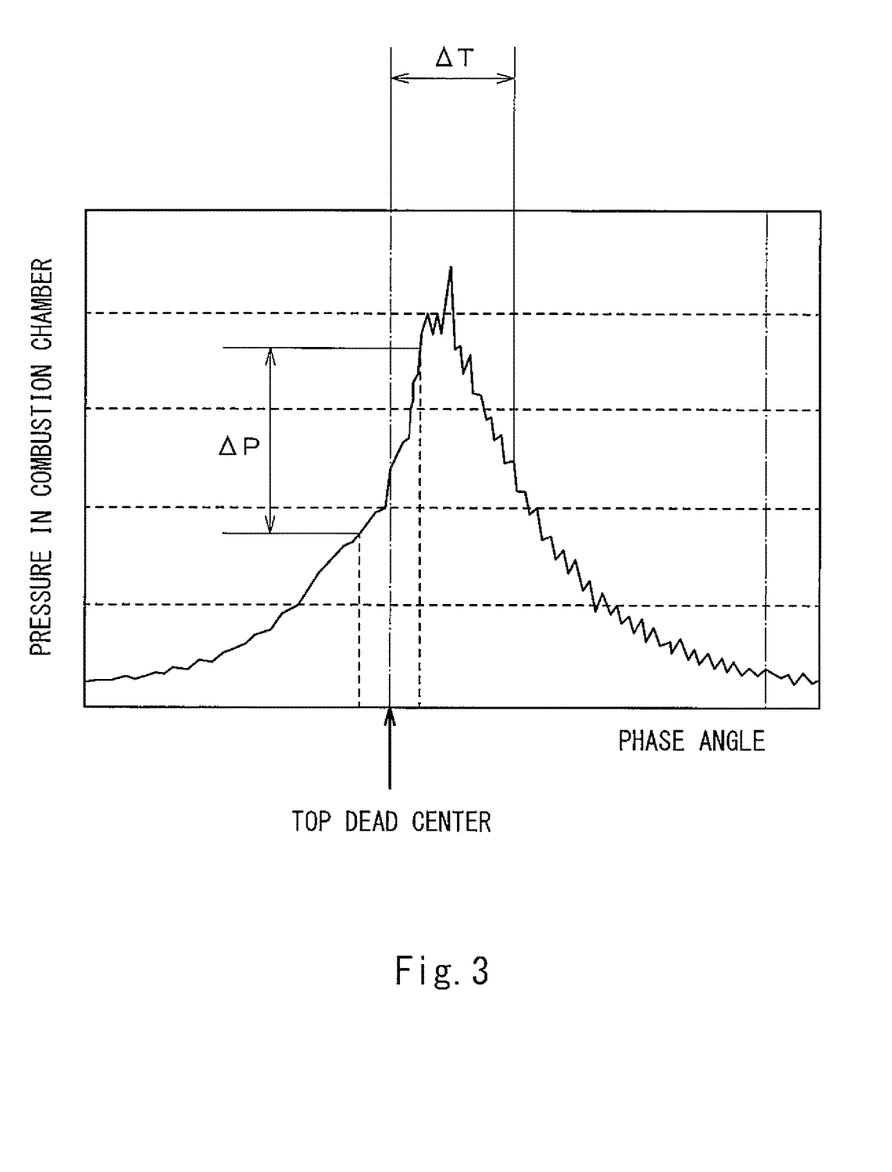
FIG. 3 shows one example of a pressure waveform measured by a second pressure sensor.

The knocking control operation is the operation of optimizing the ignition timing while keeping constant an excess air ratio λ that realizes lean burn. In the knocking control operation, control is performed based on the in-cylinder pressure detected by the second pressure sensor 62. FIG. 3 shows one example of a pressure waveform measured by the second pressure sensor 62.

The controller 7 updates an ignition timing iT for every predetermined number of cycles Cy (e.g., 5 to 20 cycles). As one example, the timing at which the piston 22 is positioned at the top dead center is set as a reference timing (0 degrees), and the ignition timing iT indicates, by the phase angle of the gas engine 2, how much before the reference timing the ignition is to be performed.

First, based on the in-cylinder pressure detected by the second pressure sensor 62, the controller 7 determines for each cycle whether the combustion state is heavy knocking, light knocking, normal, or misfire. Then, the controller 7 calculates a knocking occurrence ratio R, which is the ratio of the number of cycles CyL in which light knocking has occurred to the predetermined number of cycles Cy (i.e., R=CyL/Cy).

The combustion state is determined, for example, by the following method. The controller 7 passes the waveform shown in FIG. 3 through a filter to extract high-frequency components within a predetermined period ΔT, which is a period of time from when the piston 22 reaches the top dead center. Then, the controller 7 samples a plurality of high-frequency components from among the extracted high-frequency components, and calculates an average value PA of the sampled high-frequency components. If the average value PA is greater than or equal to a first threshold γ1 (γ1≤PA), the combustion state is determined to be heavy knocking. If the average value PA is less than the first threshold γ1, but greater than or equal to a second threshold γ2 (γ2≤PA<γ1), the combustion state is determined to be light knocking. The controller 7 also calculates a deviation ΔP between the in-cylinder pressure before reaching the top dead center and the in-cylinder pressure after reaching the top dead center. If the deviation ΔP is less than a third threshold γ3 (ΔP<γ3), the combustion state is determined to be misfire. If the deviation ΔP is greater than or equal to the third threshold γ3, and the average value PA is less than the second threshold γ2 (γ3≤ΔP, PA<γ2), the combustion state is determined to be normal.

Figure 8:
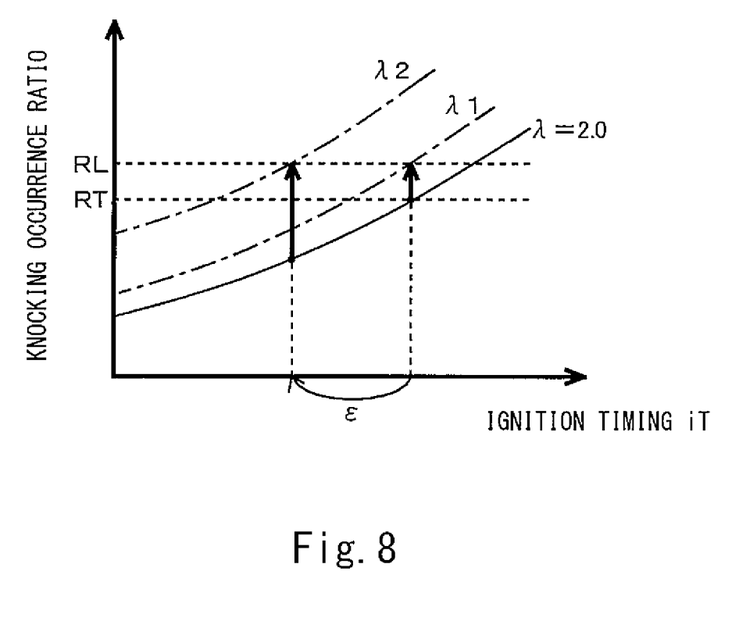
FIG. 8 is a graph showing a relationship between an ignition timing and a knocking occurrence ratio for each excess air ratio in relation to a particular rotational speed and fuel injection amount.

After calculating the knocking occurrence ratio R, the controller 7 calculates a deviation ΔR between the knocking occurrence ratio R and a target occurrence ratio RT (ΔR=RT−R). The target occurrence ratio RT is the ratio at which high efficiency is obtained without causing significant damage to the gas engine 2. The target occurrence ratio RT is derived in advance through an experiment or numerical simulation. The target occurrence ratio RT is, as shown in FIG. 8, set to a value slightly lower than a knocking limit RL. Then, the controller 7 sets a value resulting from multiplying the calculated deviation ΔR by a gain K as a correction value β of the ignition timing (β=ΔR×K), and sets a value resulting from adding the correction value β to the current ignition timing iT' as a new ignition timing iT (iT=iT'+β). If the correction value β is positive, i.e., if the knocking occurrence ratio R is lower than the target occurrence ratio RT, the ignition timing is advanced by the correction value β. If the correction value β is negative, i.e., if the knocking occurrence ratio R is higher than the target occurrence ratio RT, the ignition timing is retarded by the correction value β. In this manner, the ignition timing iT is adjusted to an optimal timing.

In other words, in a case where the excess air ratio γ is, for example, 2.0, the knocking control operation is the operation of bringing the knocking occurrence ratio close to the target occurrence ratio RT along the solid line shown in FIG. 8.

(2) Load Increase Operation

Figure 5:
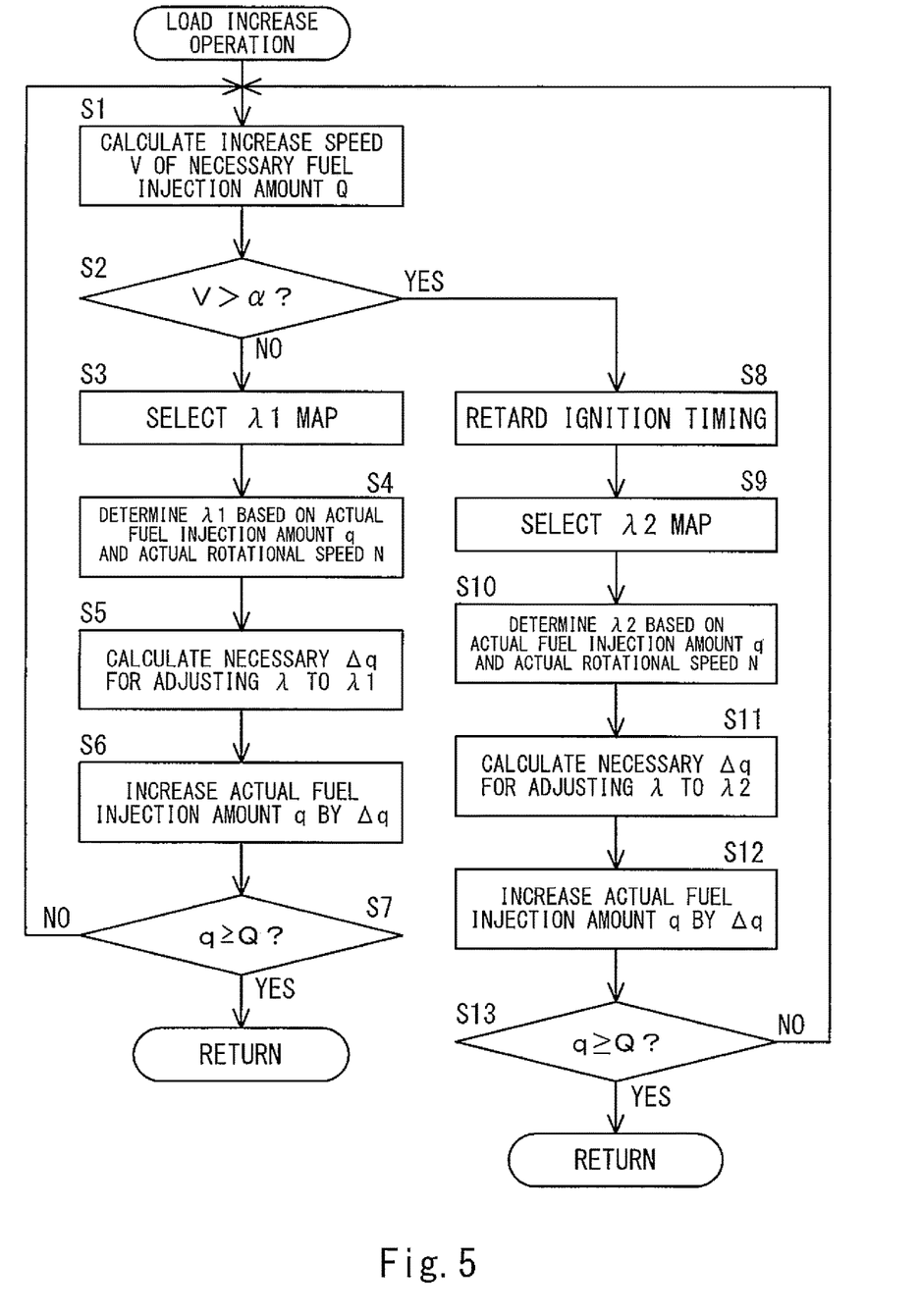
FIG. 5 is a flowchart of a load increase operation in Embodiment 1 of the present invention.

As mentioned above, when the load increases during the steady operation (i.e., when the necessary fuel injection amount Q increases), the controller 7 shifts to the load increase operation. In the load increase operation, control is performed based on the actual charge air pressure P detected by the first pressure sensor 61, the charge air temperature detected by the temperature sensor 65, and the actual rotational speed N of the gas engine 2, which is detected by the phase angle detector 63. FIG. 5 is a flowchart of the load increase operation.

Figure 4A:
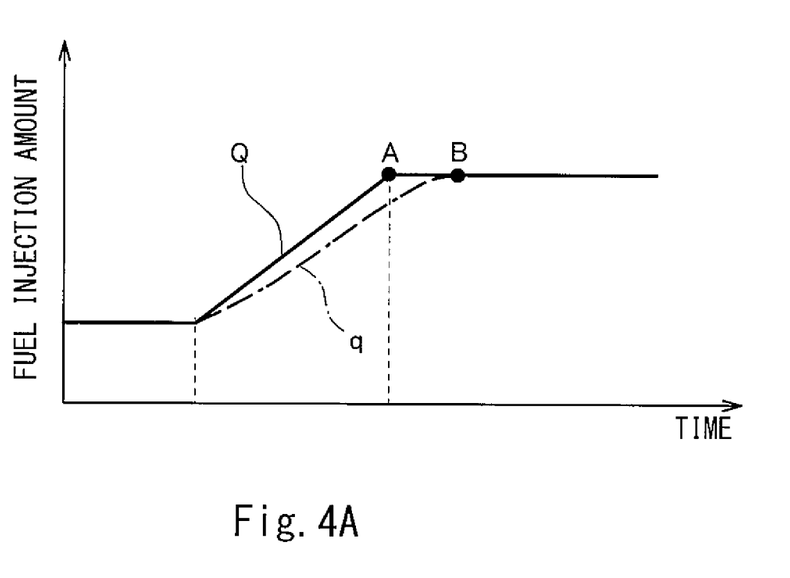
FIG. 4A is a graph showing temporal changes in a necessary fuel injection amount Q and an actual fuel injection amount q in a case where the increase speed of the necessary fuel injection amount Q is slow.
Figure 4B:
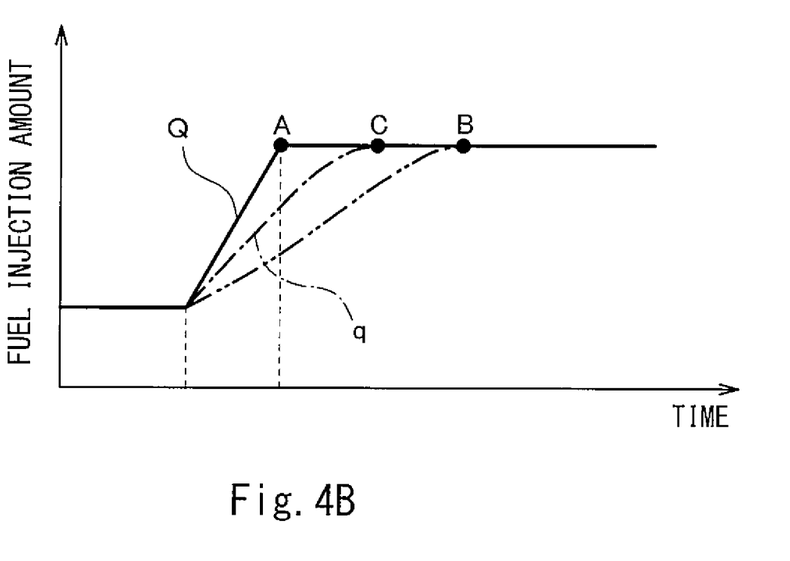
FIG. 4B is a graph showing temporal changes in the necessary fuel injection amount Q and the actual fuel injection amount q in a case where the increase speed of the necessary fuel injection amount Q is fast.

First, the controller 7 calculates an increase speed V (V=dQ/dt) of the necessary fuel injection amount Q (step S1). FIG. 4A shows a case where the degree of increase in the load is relatively small, i.e., shows a case where the increase speed V of the necessary fuel injection amount Q is slow. FIG. 4B shows a case where the degree of increase in the load is relatively great, i.e., shows a case where the increase speed V of the necessary fuel injection amount Q is fast. For example, the case where the degree of increase in the load is relatively small is a case where the telegraph lever or the like of the ship is operated slowly, whereas the case where the degree of increase in the load is relatively great is a case where the telegraph lever or the like of the ship is operated quickly.

Then, the controller 7 compares the calculated increase speed V with a threshold α (step S2). As shown in FIG. 8, since the knocking occurrence ratio is adjusted to be close to the target occurrence ratio RT in the knocking control operation, there still is a slight margin to the knocking limit RL. For this reason, the fuel gas can be increased to a first lower limit λ1 of the excess air ratio, the first lower limit λ1 being a line that passes the knocking limit RL at the ignition timing iT adjusted in the knocking control operation.

In a case where the fuel gas is increased in this manner, when the increase speed V of the necessary fuel injection amount Q is slow, a timing B at which an actual fuel injection amount q becomes the necessary fuel injection amount Q is not so delayed from an increase instruction end point A of the necessary fuel injection amount Q as shown in FIG. 4A. However, when the increase speed V of the necessary fuel injection amount Q is fast, the timing B at which the actual fuel injection amount q becomes the necessary fuel injection amount Q is significantly delayed from the increase instruction end point A of the necessary fuel injection amount Q as indicated by a two-dot chain line in FIG. 4B. The threshold α is the increase speed in a case where the delay from the increase instruction end point A to the timing B cannot be allowed when the control is performed based on the first lower limit λ1. Such a threshold α is derived in advance through an experiment or numerical simulation. It should be noted that the threshold α may be defined in association with each of the actual fuel injection amount q and the actual rotational speed N.

If the increase speed V of the necessary fuel injection amount Q is less than the threshold α, the flow proceeds to step S3. If the increase speed V is greater than the threshold α, the flow proceeds to step S8. In the present embodiment, if the increase speed V is equal to the threshold α, the flow proceeds to step S3. However, as an alternative, if the increase speed V is equal to the threshold α, the flow may proceed to step S8.

In step S3 and thereafter, the controller 7 gradually increases the actual fuel injection amount q while keeping the ignition timing iT adjusted in the knocking control operation, such that the excess air ratio λ does not fall below the first lower limit λ1. The excess air ratio λ is obtained based on the actual fuel injection amount q, the actual charge air pressure P detected by the first pressure sensor 61, and the charge air temperature detected by the temperature sensor 65.

Figure 7A:
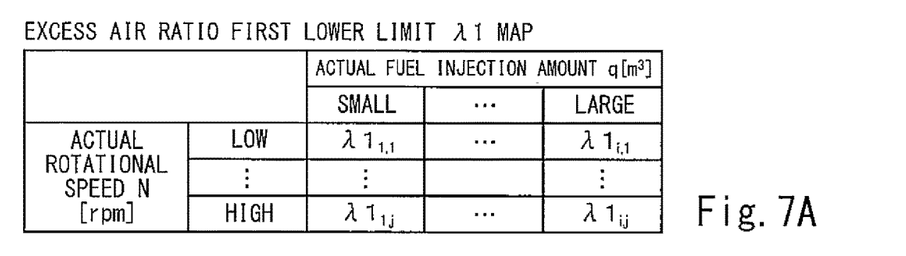
FIG. 7A is an excess air ratio first lower limit map in which first lower limit values of an excess air ratio are defined in association with the actual fuel injection amount q and the actual rotational speed N.

First, the controller 7 selects an excess air ratio first lower limit λ1 map shown in FIG. 7A (step S3). In the excess air ratio first lower limit λ1 map, first lower limit values $\lambda 1_{l,\,k}$ (1≤l≤i, 1≤k≤j) of the excess air ratio are defined in association with the actual fuel injection amount q and the actual rotational speed N. The controller 7 determines the first lower limit λ1 based on the actual fuel injection amount q and the actual rotational speed N by using the excess air ratio first lower limit λ1 map (step S4). It should be noted that the excess air ratio first lower limit λ1 map may be a three-dimensional map in which the charge air temperature is used as a parameter in addition to the actual fuel injection amount q and the actual rotational speed N.

Thereafter, the controller 7 calculates the current excess air ratio λ based on the actual fuel injection amount q, the actual charge air pressure P detected by the first pressure sensor 61, and the charge air temperature detected by the temperature sensor 65, and calculates an increase volume Δq of the fuel injection amount, the increase volume Δq being necessary for adjusting the calculated excess air ratio λ to the first lower limit λ1 determined in step S4 (step S5). The excess air ratio λ is a value resulting from dividing an actual amount of air supplied to the combustion chamber 20, the actual amount of air being obtained based on the actual charge air pressure P and the charge air temperature, by the theoretical air requirement that is necessary for perfect combustion of the fuel gas in the actual fuel injection amount q.

After calculating the increase volume Δq, the controller 7 increases the actual fuel injection amount q by Δq (step S6), and then determines whether or not the actual fuel injection amount q is greater than or equal to the necessary fuel injection amount Q (step S7). If the actual fuel injection amount q is less than the necessary fuel injection amount Q, the controller 7 returns to step S1. If the actual fuel injection amount q is greater than or equal to the necessary fuel injection amount Q, the controller 7 ends the load increase operation, and returns to the steady operation.

On the other hand, in step S8 and thereafter, the controller 7 retards the ignition timing iT by an angle ε, and then gradually increases the actual fuel injection amount q, such that the excess air ratio λ does not fall below a second lower limit λ2, which is less than the first lower limit λ1. As shown in FIG. 8, the second lower limit λ2 is a line that passes the knocking limit RL at the ignition timing iT retarded by the angle ε. Accordingly, as shown in FIG. 4B, a timing C at which the actual fuel injection amount q becomes the necessary fuel injection amount Q can be made significantly earlier than the timing B.

Figure 6A:
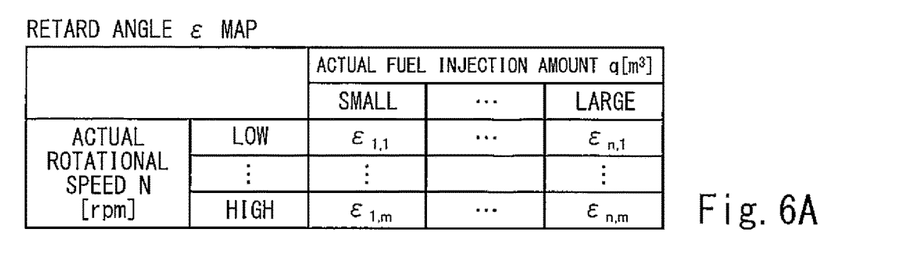
FIG. 6A is a retard angle map in which retard angle values are defined in association with the actual fuel injection amount q and an actual rotational speed N.
Figure 6B:
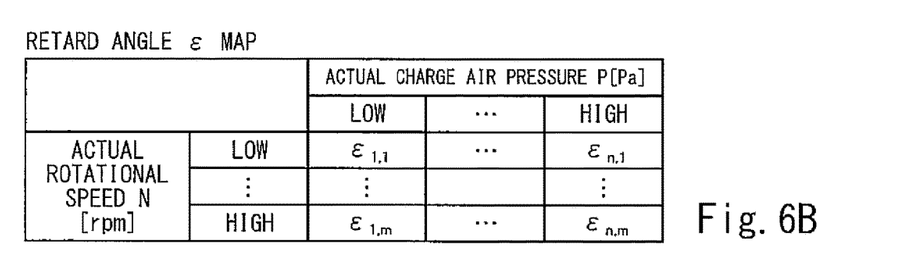
FIG. 6B is a retard angle map in which retard angle values are defined in association with an actual charge air pressure P and the actual rotational speed N.

First, the controller 7 retards the ignition timing iT by the angle ε (step S8). The angle ε by which the ignition timing iT is retarded may be determined based on the actual fuel injection amount q and the actual rotational speed N by using a retard angle ε map shown in FIG. 6A, or may be determined based on the actual charge air pressure P detected by the first pressure sensor 61 and the actual rotational speed N by using a retard angle map shown in FIG. 6B. In the retard angle ε map shown in FIG. 6A, retard angle values $\varepsilon_{l,\,k}$ (1≤l≤n, 1≤k≤m) are defined in association with the actual fuel injection amount q and the actual rotational speed N. In the retard angle ε map shown in FIG. 6B, retard angle values $\varepsilon_{l,\,k}$ (1≤l≤n, 1≤k≤m) are defined in association with the actual charge air pressure P and the actual rotational speed N.

Figure 7B:
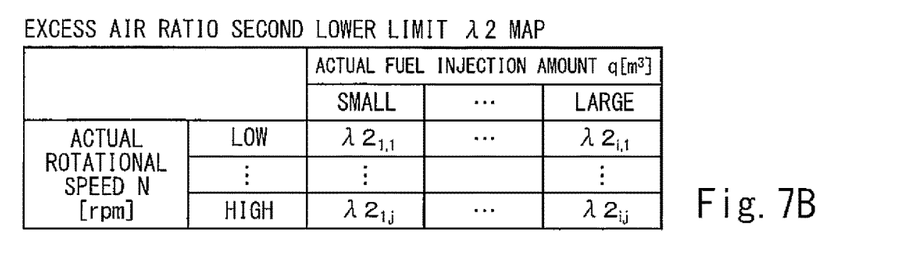
FIG. 7B is an excess air ratio second lower limit map in which second lower limit values of the excess air ratio are defined in association with the actual fuel injection amount q and the actual rotational speed N.

After retarding the ignition timing iT, the controller 7 selects an excess air ratio second lower limit λ2 map shown in FIG. 7B (step S9). In the excess air ratio second lower limit λ2 map, second lower limit values $\lambda 2_{l,\,k}$ (1≤l≤i, 1≤k≤j) of the excess air ratio are defined in association with the actual fuel injection amount q and the actual rotational speed N. All the second lower limit values $\lambda 2_{l,\,k}$ are such that when comparing each second lower limit value $\lambda 2_{l,\ k}$ with its corresponding first lower limit value i.e., when comparing the second lower limit value $\lambda 2_{l,\ k}$ and the first lower limit value $\lambda 1_{l,\ k}$ that are associated with the same actual fuel injection amount q and the same actual rotational speed N, the second lower limit value $\lambda 2_{l,\ k}$ is less than the first lower limit value $\lambda 1_{l,\ k}$. The controller 7 determines the second lower limit $\lambda 2$ based on the actual fuel injection amount q and the actual rotational speed N by using the excess air ratio second lower limit $\lambda 2$ map (step S10). It should be noted that the excess air ratio second lower limit $\lambda 2$ map may be a three-dimensional map in which the charge air temperature is used as a parameter in addition to the actual fuel injection amount q and the actual rotational speed N.

Thereafter, the controller 7 calculates the current excess air ratio $\lambda$ based on the actual fuel injection amount q, the charge air pressure P detected by the first pressure sensor 61, and the charge air temperature detected by the temperature sensor 65, and calculates an increase volume $\Delta q$ of the fuel injection amount, the increase volume $\Delta q$ being necessary for adjusting the calculated excess air ratio $\lambda$ to the second lower limit $\lambda 2$ determined in step S10 (step S11).

After calculating the increase volume $\Delta q$, the controller 7 increases the actual fuel injection amount q by $\Delta q$ (step S12), and then determines whether or not the actual fuel injection amount q is greater than or equal to the necessary fuel injection amount Q (step S13). If the actual fuel injection amount q is less than the necessary fuel injection amount Q, the controller 7 returns to step S1. If the actual fuel injection amount q is greater than or equal to the necessary fuel injection amount Q, the controller 7 ends the load increase operation, and returns to the steady operation.

As described above, in the gas engine drive system 1 of the present embodiment, in a case where the degree of increase in the load is relatively great, the margin of the excess air ratio $\lambda$ to the knocking limit RL is increased by retarding the ignition timing iT, and thereby the actual fuel injection amount q can be increased by a large volume. This consequently makes it possible to improve the load responsiveness while suppressing knocking.

Moreover, in the present embodiment, both when the degree of increase in the load is relatively small and when the degree of increase in the load is relatively great, the increase volume $\Delta q$ of the actual fuel injection amount q can be determined to be maximized by using the lower limits $\lambda 1$ and $\lambda 2$ of the excess air ratio $\lambda$.

Embodiment 2

Next, a gas engine drive system according to Embodiment 2 of the present invention is described with reference to FIGS. 9 to 11. It should be noted that the only difference of the gas engine drive system of the present embodiment from the gas engine drive system 1 of Embodiment 1 is a part of the flowchart of the load increase operation. Hereinafter, only that part of the flowchart is described.

Figure 9:
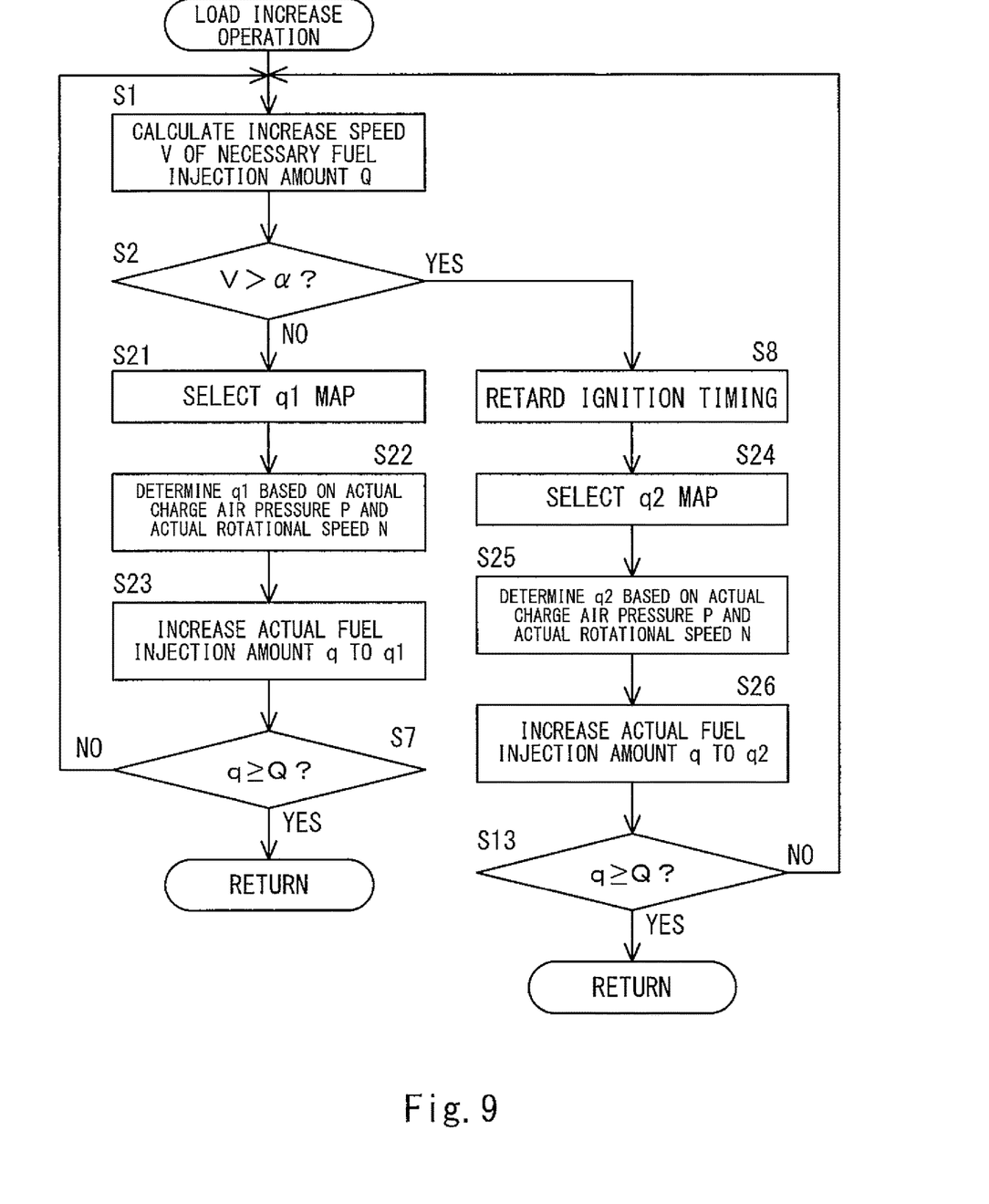
FIG. 9 is a flowchart of the load increase operation in Embodiment 2 of the present invention.

In the present embodiment, as shown in FIG. 9, steps S21 to S23 are adopted instead of steps S3 to S6 in the flowchart shown in FIG. 5, and steps S24 to S26 are adopted instead of steps S9 to S12 in the flowchart shown in FIG. 5. Specifically, if the increase speed V of the necessary fuel injection amount Q is less than the threshold $\alpha$, the flow proceeds to step S21, and if the increase speed V is greater than the threshold $\alpha$, the flow proceeds to step S24 after step S8. It should be noted that, in the present embodiment, if the increase speed V is equal to the threshold $\alpha$, the flow proceeds to step S21. However, as an alternative, if the increase speed V is equal to the threshold $\alpha$, the flow may proceed to step S8.

In step S21 and thereafter, the controller 7 gradually increases the actual fuel injection amount q while keeping the ignition timing iT adjusted in the knocking control operation, such that the actual fuel injection amount q does not exceed a first upper limit q1. As shown in FIG. 11, the first upper limit q1 is a line that passes the knocking limit RL at the ignition timing iT adjusted in the knocking control operation.

Figure 10A:
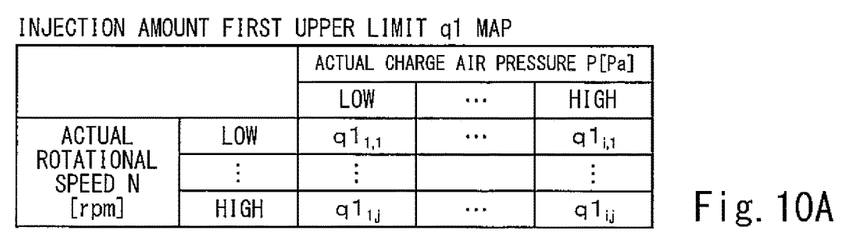
FIG. 10A is an injection amount first upper limit map in which first upper limit values of the fuel injection amount are defined in association with the actual charge air pressure P and the actual rotational speed N.
Figure 11:
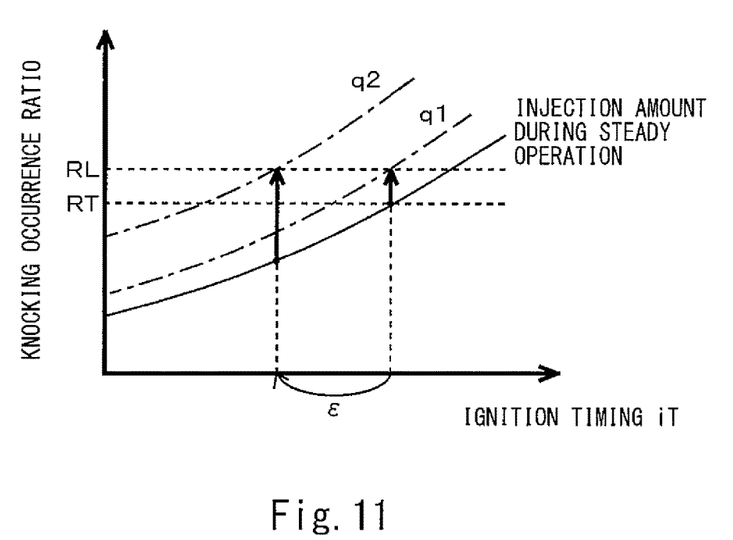
FIG. 11 is a graph showing a relationship between an ignition timing and a knocking occurrence ratio for each fuel injection amount in relation to a particular rotational speed and charge air pressure.

First, the controller 7 selects an injection amount first upper limit q1 map shown in FIG. 10A (step S3). In the injection amount first upper limit q1 map, first upper limit values $q1_{l,\ k}$ ($1 \leq l \leq i$, $1 \leq k \leq j$) of the fuel injection amount are defined in association with the actual charge air pressure P and the actual rotational speed N. The controller 7 determines the first upper limit q1 based on the actual charge air pressure P detected by the first pressure sensor 61 and the actual rotational speed N by using the injection amount first upper limit q1 map (step S22). It should be noted that the injection amount first upper limit q1 map may be a three-dimensional map in which the charge air temperature is used as a parameter in addition to the actual charge air pressure P and the actual rotational speed N.

Thereafter, the controller 7 increases the actual fuel injection amount q to the first upper limit q1 (step S22), and then determines whether or not the actual fuel injection amount q is greater than or equal to the necessary fuel injection amount Q (step S7). If the actual fuel injection amount q is less than the necessary fuel injection amount Q, the controller 7 returns to step S1, and if the actual fuel injection amount q is greater than or equal to the necessary fuel injection amount Q, the controller 7 ends the load increase operation and returns to the steady operation.

On the other hand, in step S8 and thereafter, the controller 7 retards the ignition timing iT by an angle $\varepsilon$, and then gradually increases the actual fuel injection amount q, such that the actual fuel injection amount q does not exceed a second upper limit q2, which is greater than the first upper limit q1. As shown in FIG. 11, the second lower limit $\lambda 2$ is a line that passes the knocking limit RL at the ignition timing iT retarded by the angle $\varepsilon$.

Figure 10B:
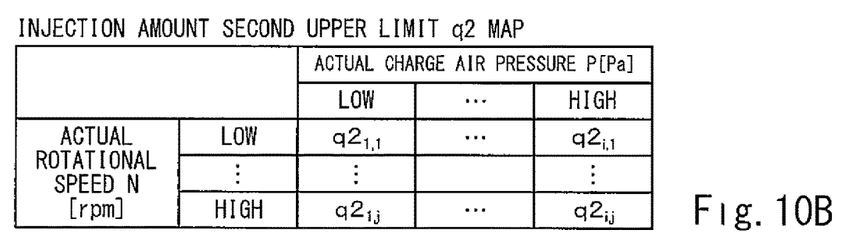
FIG. 10B is an injection amount second upper limit map in which second upper limit values of the fuel injection amount are defined in association with the actual charge air pressure P and the actual rotational speed N.

After retarding the ignition timing iT in step S8, the controller 7 selects an injection amount second upper limit q2 map shown in FIG. 10B (step S24). In the injection amount second upper limit q2 map, second upper limit values $q2_{l,\ k}$ ($1 \leq l \leq i$, $1 \leq k \leq j$) of the fuel injection amount are defined in association with the actual charge air pressure P and the actual rotational speed N. All the second upper limit values $q2_{l,\ k}$ are such that when comparing each second upper limit value $q2_{l,\ k}$ with its corresponding first upper limit value $q1_{l,\ k}$, i.e., when comparing the second upper limit value $q2_{l,\ k}$ and the first upper limit value $q1_{l,\ k}$ that are associated with the same actual charge air pressure P and the same actual rotational speed N, the second upper limit value $q2_{l,\ k}$ is greater than the first upper limit value $q1_{l,\ k}$. The controller 7 determines the second upper limit q2 based on the actual charge air pressure P detected by the first pressure sensor 61 and the actual rotational speed N by using the injection amount second upper limit q2 map (step S25). It should be noted that the injection amount second upper limit q2 map may be a three-dimensional map in which the charge air temperature is used as a parameter in addition to the actual charge air pressure P and the actual rotational speed N.

Thereafter, the controller 7 increases the actual fuel injection amount q to the second upper limit q2 (step S26), and then determines whether or not the actual fuel injection amount q is greater than or equal to the necessary fuel injection amount Q (step S13). If the actual fuel injection amount q is less than the necessary fuel injection amount Q, the controller 7 returns to step S1, and if the actual fuel injection amount q is greater than or equal to the necessary fuel injection amount Q, the controller 7 ends the load increase operation and returns to the steady operation.

As described above, in the gas engine drive system 1 of the present embodiment, in a case where the degree of increase in the load is relatively great, the margin of the excess air ratio $\lambda$ to the knocking limit RL is increased by retarding the ignition timing iT, and thereby the actual fuel injection amount q can be increased by a large volume. This consequently makes it possible to improve the load responsiveness while suppressing knocking.

Moreover, in the present embodiment, both when the degree of increase in the load is relatively small and when the degree of increase in the load is relatively great, the increase volume $\Delta q$ of the actual fuel injection amount q can be determined to be maximized by using the upper limits q1 and q2 of the actual fuel injection amount q.

Furthermore, in the present embodiment, since it is not necessary to calculate the excess air ratio $\lambda$, the temperature sensor 65 detecting the charge air temperature (see FIG. 2) can be eliminated.

OTHER EMBODIMENTS

Desirably, in Embodiments 1 and 2, the turbine 32 is a variable geometry turbo, in which the degree of opening of the nozzle that blows exhaust gas to the turbine impeller is variable, and the turbine 32 is controlled by the controller 7. In this case, when the degree of increase in the load is relatively great (i.e., when the increase speed V of the necessary fuel injection amount Q is greater than the threshold $\alpha$), the controller 7 may control the turbine 32 to reduce the degree of opening of the nozzle. Through such control, the actual charge air pressure P increases promptly, which makes it possible to further improve the load responsiveness.

In order to cause the turbocharger 3 to promptly operate in such a manner, when the degree of increase in the load is relatively great, compressed air accumulated in an unshown pressure accumulating tank may be supplied to the compressor 31 of the turbocharger 3 (so-called jet assisting).

In Embodiments 1 and 2, whether or not the load has increased and the degree of increase in the load are determined by monitoring the necessary fuel injection amount Q. However, as an alternative, whether or not the load has increased and the degree of increase in the load can be determined by monitoring the actual rotational speed N or the actual charge air pressure P of the gas engine 2.

Figure 12:
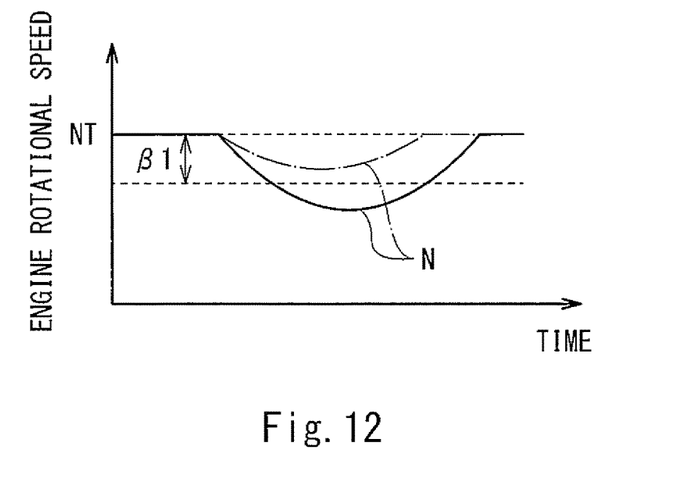
FIG. 12 is a graph showing temporal changes in the actual rotational speed N of the engine.

For example, as shown in FIG. 12, the actual rotational speed N of the gas engine 2 decreases from the target rotational speed NT when the load increases. Here, how much the actual rotational speed N decreases depends on the degree of increase in the load. The solid line in FIG. 12 indicates a time when the degree of increase in the load is relatively great, and the one-dot chain line in FIG. 12 indicates a time when the degree of increase in the load is relatively small. Accordingly, if the deviation between the actual rotational speed N and the target rotational speed NT is less than a threshold $\beta 1$, it can be determined that the degree of increase in the load is relatively small, and if the deviation between the actual rotational speed N and the target rotational speed NT is greater than the threshold $\beta 1$, it can be determined that the degree of increase in the load is relatively great.

Alternatively, in a case where the propeller shaft 13 is provided with a torque meter, whether or not the load has increased and the degree of increase in the load may be determined based on a torque measured by the torque meter.

Although not illustrated, when the load increases, normally, a target charge air pressure PT increases in accordance with the load, and increase in the actual charge air pressure P is delayed from the increase in the target charge air pressure PT (so-called turbo lag). For this reason, the deviation between the actual charge air pressure P and the target charge air pressure PT increases. In addition, the amount of increase in the deviation depends on the degree of increase in the load. Accordingly, if the deviation between the actual charge air pressure P and the target charge air pressure PT is less than a threshold $\beta 2$, it can be determined that the degree of increase in the load is relatively small, and if the deviation between the actual charge air pressure P and the target charge air pressure PT is greater than the threshold $\beta 2$, it can be determined that the degree of increase in the load is relatively great.

As an alternative, whether or not the load has increased and the degree of increase in the load may be determined based on the fuel injection period of the main fuel injection valve 51. As another alternative, in a case where the propeller 12 is a variable pitch propeller, whether or not the load has increased and the degree of increase in the load may be determined based on the propeller pitch. As yet another alternative, whether or not the load has increased and the degree of increase in the load may be determined based on the operating amount of the telegraph lever or the like operated by the operator of the ship.

Embodiments 1 and 2 propose the technique for dealing with rapid load increase. However, in order to suppress knocking, the rapid load increase itself may be suppressed. For example, the upper limit of the increase speed of the actual fuel injection amount q may be set, and even when the operator of the ship performs an operation of rapidly increasing the navigation speed of the ship, the actual output of the gas engine 2 may be increased slowly. Alternatively, in a case where the propeller 12 is a variable pitch propeller, the propeller pitch may be increased slowly.

INDUSTRIAL APPLICABILITY

The gas engine drive system of the present invention is not necessarily used in a ship, but may be used in, for example, power generating equipment, construction machines, or railways.

REFERENCE SIGNS LIST 1 gas engine drive system
2 gas engine
3 turbocharger
31 compressor
32 turbine
51 main fuel injection valve (fuel injection system)
55 spark plug (ignition system)
7 controller

The invention claimed is:

1. A gas engine drive system comprising:
a gas engine connected to a turbocharger including a compressor and a turbine;

a fuel injection system that injects a fuel gas into air supplied to the gas engine;

an ignition system for igniting an air-fuel mixture of the fuel gas and the air; and a controller that controls the fuel injection system and the ignition system, wherein the controller:

performs a knocking control operation of optimizing an ignition timing as a steady operation; and in a case where a load of the gas engine increases during the steady operation, when a degree of increase in the load is relatively small, gradually increases an actual fuel injection amount while keeping the ignition timing, and when the degree of increase in the load is relatively great, retards the ignition timing and then gradually increases the actual fuel injection amount.

2. A method of controlling a gas engine connected to a turbocharger including a compressor and a turbine, the method comprising:

performing a knocking control operation of optimizing an ignition timing as a steady operation; and in a case where a load of the gas engine increases during the steady operation, when a degree of increase in the load is relatively small, gradually increasing an actual fuel injection amount while keeping the ignition timing, and when the degree of increase in the load is relatively great, retarding the ignition timing and then gradually increasing the actual fuel injection amount.

3. The method of controlling a gas engine according to claim 2, wherein the case where the load increases is a case where a necessary fuel injection amount increases, when the degree of increase in the load is relatively small is when an increase speed of the necessary fuel injection amount is less than a threshold, and when the degree of increase in the load is relatively great is when the increase speed of the necessary fuel injection amount is greater than the threshold.

4. The method of controlling a gas engine according to claim 2, wherein the case where the load increases is a case where an actual rotational speed of the gas engine decreases from a target rotational speed, when the degree of increase in the load is relatively small is when a deviation between the actual rotational speed and the target rotational speed is less than a threshold, and when the degree of increase in the load is relatively great is when the deviation between the actual rotational speed and the target rotational speed is greater than the threshold.

5. The method of controlling a gas engine according to claim 2, wherein the case where the load increases is a case where an actual charge air pressure that is a discharge pressure of the compressor decreases from a target charge air pressure, and when the degree of increase in the load is relatively small is when a deviation between the actual charge air pressure and the target charge air pressure is less than a threshold, and when the degree of increase in the load is relatively great is when the deviation between the actual charge air pressure and the target charge air pressure is greater than the threshold.

6. The method of controlling a gas engine according to claim 2, comprising:

when the degree of increase in the load is relatively small, gradually increasing the actual fuel injection amount, such that an excess air ratio does not fall below a first lower limit; and when the degree of increase in the load is relatively great, gradually increasing the actual fuel injection amount, such that the excess air ratio does not fall below a second lower limit that is less than the first lower limit.

7. The method of controlling a gas engine according to claim 2, comprising:

when the degree of increase in the load is relatively small, gradually increasing the actual fuel injection amount, such that the actual fuel injection amount does not exceed a first upper limit, and when the degree of increase in the load is relatively great, gradually increasing the actual fuel injection amount, such that the actual fuel injection amount does not exceed a second upper limit that is greater than the first upper limit.

8. The method of controlling a gas engine according to claim 2, wherein the gas engine is used as a main engine of a ship.

* * * * *